US011586203B2

(12) United States Patent
Ewert

(10) Patent No.: US 11,586,203 B2
(45) Date of Patent: Feb. 21, 2023

(54) METHOD FOR TRAINING A CENTRAL ARTIFICIAL INTELLIGENCE MODULE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 1163 days.

(21) Appl. No.: 16/162,527

(22) Filed: Oct. 17, 2018

(65) Prior Publication Data

US 2019/0129421 A1 May 2, 2019

(30) Foreign Application Priority Data

Oct. 30, 2017 (DE) ........................ 102017219441.3

(51) Int. Cl.

*G05D 1/00* (2006.01)
*H04L 67/10* (2022.01)
(Continued)

(52) U.S. Cl.

CPC ......... *G05D 1/0088* (2013.01); *G06K 9/6256* (2013.01); *G06K 9/6262* (2013.01); *G06N 3/008* (2013.01); *G06N 3/0454* (2013.01); *G06N 3/08* (2013.01); *G07C 5/008* (2013.01); *H04L 67/10* (2013.01); *H04L 67/12* (2013.01)

(58) Field of Classification Search

CPC .. G05D 1/0088; G06K 9/6256; G06K 9/6262; G06N 3/008; G06N 3/0454; G06N 3/08; G07C 5/008; H04L 67/10; H04L 67/12
See application file for complete search history.

(56) References Cited

U.S. PATENT DOCUMENTS 9,836,819 B1 * 12/2017 Donsbach ............ G11B 27/031
10,748,057 B1 * 8/2020 Li ............................ G06N 3/08
(Continued)

OTHER PUBLICATIONS

Bojarski, et al.: “End to End Learning for Self-Driving Cars”, (2016) URL: https://arxiv.org//pdf/1604.07316.pdf, pp. 1-9.
(Continued)

*Primary Examiner* — Mohamed Barakat
*Assistant Examiner* — Rufus C Point
(74) *Attorney, Agent, or Firm* — Norton Rose Fulbright US LLP; Gerard Messina

(57) ABSTRACT

A method for training a central artificial intelligence module (“AI module”) for highly or fully automated operation of a vehicle, the central AI module to translate input signals into output signals, and the translation is carried out using a processing chain that is adaptable by modifying values of internal processing parameters, wherein the training of the central AI module takes place by modifying the internal processing parameters based on further internal processing parameters of further AI modules, the further AI modules being in a plurality of vehicles and translating input signals into output signals in each case, and the translations taking place using processing chains that are able to be adapted by modifying values of further internal processing parameters, the further AI modules having been trained using input signals that are based on environment data acquired with using environment sensor systems installed in the vehicles.

14 Claims, 2 Drawing Sheets start — 101
carry out learning step for training first AI module — 102
carry out learning step in a second vehicle — 103
transmit adapted first processing parameters from the first vehicle to the central AI module — 104
transmit adapted second processing parameters from the second vehicle to the central AI module — 105
train central AI module based on transmitted first and second processing parameters — 106
transmit trained central AI module to the first and second vehicle — 116
operate vehicles to which central AI module was transmitted in an automated manner based on the central AI module — 126
end — 107

(51) Int. Cl.

| | |
|---|---|
| ***G06K 9/62*** | (2022.01) |
| ***G06N 3/00*** | (2006.01) |
| ***G06N 3/04*** | (2006.01) |
| ***G06N 3/08*** | (2006.01) |
| ***G07C 5/00*** | (2006.01) |
| ***H04L 67/12*** | (2022.01) |
| ***G06N 3/008*** | (2023.01) |

(56) References Cited

U.S. PATENT DOCUMENTS

| | | | | |
|---|---|---|---|---|
| 2008/0301069 | A1* | 12/2008 | Chen | G06F 16/951 706/12 |
| 2015/0100530 | A1* | 4/2015 | Mnih | A63F 13/67 706/25 |
| 2017/0293480 | A1* | 10/2017 | Wexler | G06F 8/65 |
| 2018/0174060 | A1* | 6/2018 | Velez-Rojas | G06N 5/02 |
| 2019/0079898 | A1* | 3/2019 | Xiong | G06F 9/5072 |
| 2019/0272677 | A1* | 9/2019 | Pinti | G06T 7/80 |
| 2019/0384273 | A1* | 12/2019 | Han | G05B 13/027 |
| 2020/0086871 | A1* | 3/2020 | Gotoda | G08G 1/16 |
| 2021/0216287 | A1* | 7/2021 | Vinod | G06F 40/103 |

OTHER PUBLICATIONS

Utans, Joachim: “Weight Averaging for Neural Networks and Local Resampling Schemes”, in Proc. AAAI-96 Workshop on Integrating Multiple Learned Models, AMI Press (1996), pp. 133-138.

* cited by examiner

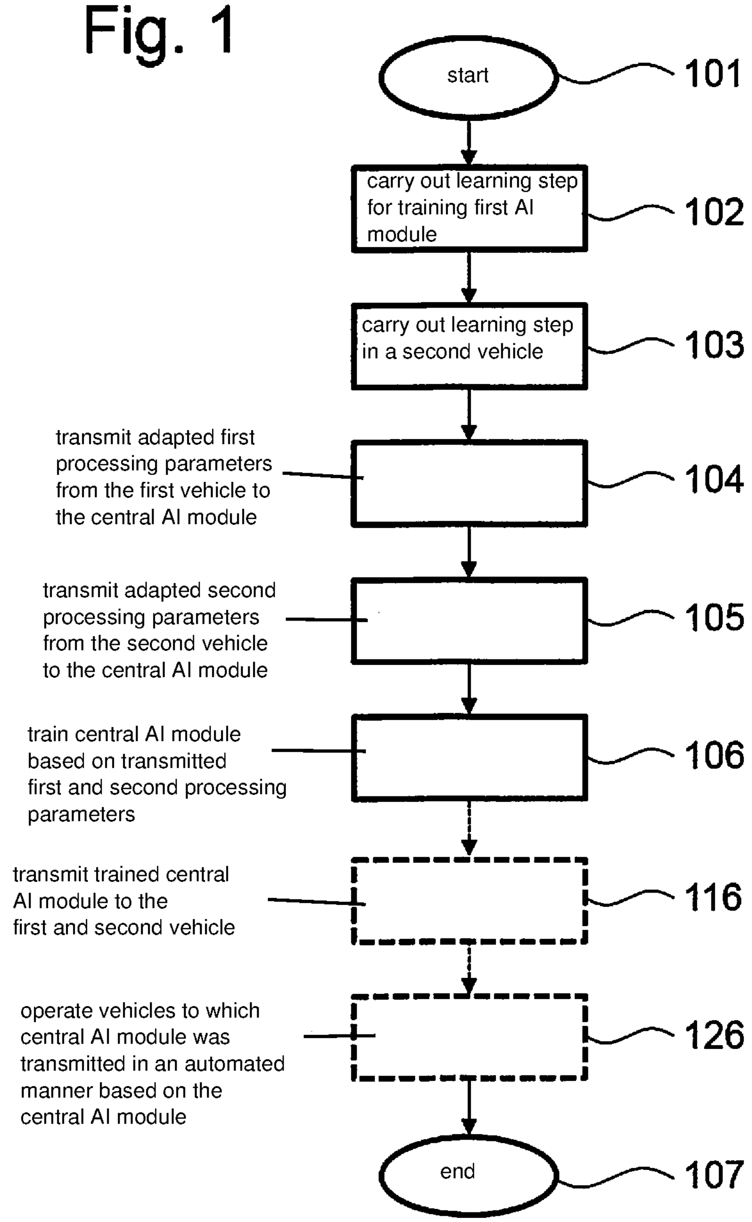

Fig. 1
start
101
carry out learning step for training first AI module
102
carry out learning step in a second vehicle
103
transmit adapted first processing parameters from the first vehicle to the central AI module
104
transmit adapted second processing parameters from the second vehicle to the central AI module
105
train central AI module based on transmitted first and second processing parameters
106
transmit trained central AI module to the first and second vehicle
116
operate vehicles to which central AI module was transmitted in an automated manner based on the central AI module
126
end
107

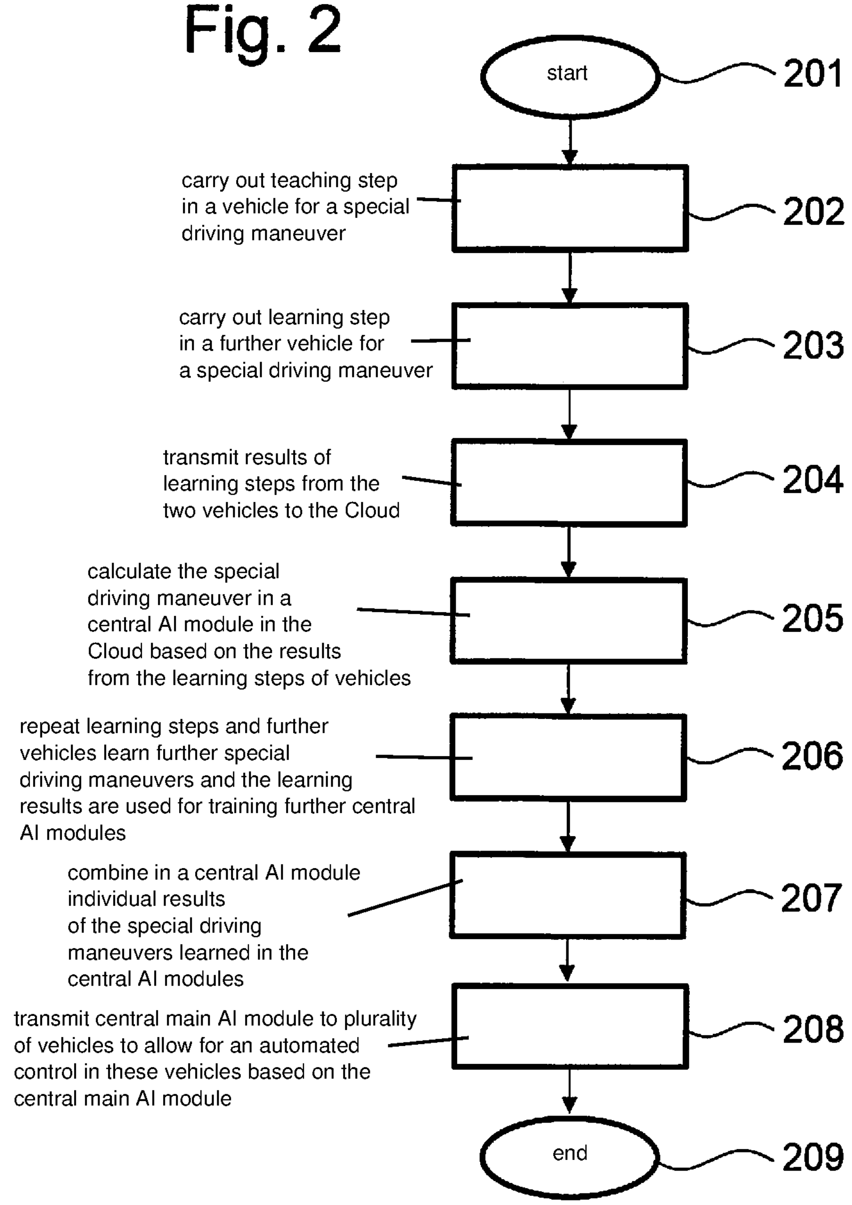
Fig. 2
start
201
carry out teaching step in a vehicle for a special driving maneuver
202
carry out learning step in a further vehicle for a special driving maneuver
203
transmit results of learning steps from the two vehicles to the Cloud
204
calculate the special driving maneuver in a central AI module in the Cloud based on the results from the learning steps of vehicles
205
repeat learning steps and further vehicles learn further special driving maneuvers and the learning results are used for training further central AI modules
206
combine in a central AI module individual results of the special driving maneuvers learned in the central AI modules
207
transmit central main AI module to plurality of vehicles to allow for an automated control in these vehicles based on the central main AI module
208
end
209

METHOD FOR TRAINING A CENTRAL ARTIFICIAL INTELLIGENCE MODULE

CROSS REFERENCE

The present application claims the benefit under 35 U.S.C. § 119 of German Patent Application No. DE 102017219441.3 filed on Oct. 20, 2017, which is expressly incorporated herein by reference in its entirety.

BACKGROUND INFORMATION

The present invention relates to a method for training a central artificial intelligence module.

Conventional learning methods for artificial intelligence may include training a neural network based on environment data that are acquired by vehicles and centrally stored. Raw data from the vehicle sensors, which may possibly include sensitive information that restricts the privacy of the vehicle users, are used in the process.

In addition, learning methods are available in which an artificial intelligence intended for automated driving is trained in a vehicle on the basis of the environment data acquired by the vehicle. In order to compile a sufficient data quantity for training the artificial intelligence, the vehicle must travel an extremely high number of test kilometers.

SUMMARY

The present invention provides a method for training a central artificial intelligence module (AI module), located on a server, for the highly or fully automated operation of a vehicle. The present method includes, e.g., the following steps:

- Carrying out at least one learning step for training a first AI module located in a first vehicle or a Hil (Hardware in the Loop) simulation of a first vehicle, using input signals, the input signals being based on environment data acquired with the aid of an environment sensor system installed in the first vehicle, or based on recorded environment data of a vehicle, and first internal processing parameters of the first AI module, on the basis of which input signals input into the first AI module are translated into output signals, are adapted during the training;
- Executing at least one learning step for training a second AI module located in a second vehicle or in a HIL simulation of a second vehicle, using input signals, the input signals being based on environment data acquired with the aid of an environment sensor system installed in the second vehicle, or based on recorded environment data of a vehicle, second internal processing parameters of the second AI module, on the basis of which input signals input into the second AI module are translated into output signals, being adapted during the training;
- Transmitting the adapted first internal processing parameters to the server;
- Transmitting the adapted second internal processing parameters to the server;
- Training the central AI module based on the transmitted adapted first and second internal processing parameters.

The server, for example, may be a central computer, which is connected to the Internet and is able to receive data from vehicles and transmit data to vehicles. In this context, the training of the central AI module particularly takes place on the server.

The artificial intelligence module (hereinafter, artificial intelligence module is abbreviated to AI module in this application) situated on the central server may be a module which is able to process problems autonomously. For example, an artificial neural network, a recurrent neural network, a convolutional neural network, or a network based on backpropagation may be used as an AI module. The use of an auto-encoder or of comparable structures or algorithms is possible as well, as are combinations of multiple algorithms or network types. In general, multiple networks may also be networked with one another, and output values of individual networks may be used as input values for further networks.

The further AI modules that are used in vehicles or in hardware in the loop (HiL) simulations, for example, may have a corresponding structure. In one specific embodiment of the present invention, they may even have an identical configuration. The further AI modules likewise have the task of solving problems autonomously. For this purpose, input data are translated into output data based on variable internal processing parameters. When training the further AI modules, these processing parameters are adapted based on input data that correspond to acquired environment data. Methods such as reinforced learning, for example, may be used for this purpose. Additionally or alternatively, based on the input data, it is also possible to supply anticipated output data, and thus a learning set, by which an AI module is trained. The adapted processing parameters of these further AI modules are able to be transmitted to the central AI module independently of a learning status of the AI modules.

A characteristic feature of the central AI module is that it is trained on the basis of the transmitted processing parameters of the further AI modules, in particular the first and the second AI module. For this purpose, the processing parameters of the further AI modules may be used for ascertaining the central processing parameters of the central AI module, e.g., using algorithms that are based on stochastic gradient methods. For example, the central processing parameters may also be ascertained by averaging corresponding further processing parameters.

If the AI modules are developed as neural networks, the processing parameters may particularly include values of the weights, which determine the information forwarding between different neurons. When training neural networks, it is common practice to randomly select starting values of the weights. For the distributed learning with the aid of multiple AI modules, it seems useful to select all output values of the weights identically in the individual AI modules. This makes it possible to increase the likelihood that the weights in the central KI converge.

The transmission of the processing parameters of the first and/or the second AI module may be carried out using conventional Car2X communications means and methods, for instance. Transmissions via radio, e.g., via WLAN and/or UMTS and/or LTE, for example, are an option.

If the first and/or the second AI module is/are in a HIL simulation, then environment data recorded by a random vehicle may be used for training this AI module. To train the first and second AI module, it is therefore possible to use environment data of different vehicles or of the same vehicle. When environment data of the same vehicle are selected, it suggests itself to select environment data from different driving situations. On the one hand, the environment data may be fed into the AI modules in real time, and on the other hand, the environment data may first be recorded and be fed/input into the AI modules at a time offset. Recorded data are recommended especially for the HIL simulation.

A highly automated vehicle or a vehicle operated in a highly automated manner is a vehicle which is at least able to carry out predefined driving functions in an autonomous manner without the intervention of a driver. Exemplary driving functions are systems having automated transverse and/or longitudinal control, e.g., parking assistance systems, congestion-assistance systems, highway pilots and the like.

Fully automated vehicles or vehicles operated in a fully automated manner have the ability to perform a plurality of such driving functions, so that even complex routes may possibly be driven by the vehicle in an autonomous manner without requiring an intervention by a driver. It is possible that fully automated vehicles are able to manage virtually all typical driving situations, which means that they have the capability of autonomously participating in road traffic without driver interventions. These vehicles may perhaps no longer allow for an intervention by a driver since they no longer require a driver.

Vehicles in this context may be land, air and space and water vehicles, especially passenger cars, trucks, buses, shuttles, two-wheeled vehicles, boats, airplanes, helicopters, and drones.

For example, it is also possible to train a central AI module for operating an automated robot and/or forklift with the aid of distributed AI modules in automated robots and/or forklifts.

The example method in accordance with the present application may have the advantage that training of a central AI module does not necessarily require the use of input data, but that such training may also be carried out on the basis of processing parameters of further AI modules. In addition, it may suffice that the further AI modules, which are located in the vehicles, carry out only a few learning steps which, by themselves, would not be adequate for training an AI module but in combination with further AI modules supply a sufficiently satisfactory learning result. As a consequence, the individual vehicles may thus also need less processing power as the case may be and therefore allow for a more cost-effective manufacture. In addition, using this method, the training results may be used for training the central AI module at a time offset since the processing parameters are able to be buffer-stored. Another essential advantage of this method in comparison with learning methods that train a central AI module on the basis of the environment data acquired by the vehicles is that these environment data need no longer be transmitted. Based on the learning process of the AI modules located in the vehicles, the input data are compressed in the form of the adapted processing parameters. Since only these compressed processing parameters are transmitted to the central AI module, it is thereby possible to vastly reduce the data volume that has to be transmitted. As a result, there is barely any stress on the transmission capacities of Car-to-X communications links of the individual vehicles because only the calculation results of a learning step are transmitted to the Cloud. In addition, the input signals and/or the environment data are unable to be reconstituted/reconstructed from the transmitted processing parameters. This protects input signals that may possibly include personal data and/or environment data and it allows for anonymized learning without sensitive data. Installing AI modules in as many vehicles as possible, which particularly move in different regions, it is possible to ensure that the broadest possible learning results from driving maneuvers are available on the server for calculating the central AI module. Due to the parallel learning processes in vehicles, the learning process of the central AI module, too, is able to be parallelized and thus can be vastly accelerated. Moreover, the teaching on a central server offers the advantage that very high computing power is able to be put at the disposal of the server. As a result, the training of the central AI module may be carried out in an efficient manner via HPC (high performance computing).

When the first and/or the second AI module execute(s) learning steps in a HIL simulation, then input data may also be fed in at a greater frequency than in a vehicle because the processing speed is greater than in the vehicle, provided the HiL is configured accordingly. This allows for a faster and more efficient execution of individual learning steps.

In one further specific embodiment of the present method, the central AI module is developed to translate input signals into output signals based on adaptable central internal processing parameters. In the step of training the central AI module, the central internal processing parameters are adapted based on the adapted first and second internal processing parameters. In particular, no input signals from the first or second vehicle or from the first or second HIL simulation are used for adapting the central internal processing parameters.

In one further specific embodiment of the present method, the first and/or the second AI module(s) is/are used for teaching individual driving functions and/or driving maneuvers. This makes it possible to assign different learning tasks to different vehicles, the vehicles, for example, being operated only in certain areas such as super-highways. Distributing individual learning tasks makes it possible to enhance the performance of individual AI modules and the central AI module.

In one further specific embodiment of the present method, identical internal output processing parameters are selected for the first and second AI module, the internal output processing parameters corresponding to the internal processing parameters prior to a first learning process of the AI modules. In particular, the first and the second internal output processing parameters have identical output values.

This specific embodiment of the present invention offers the advantage of allowing for a better combination of the processing parameters because the learning processes are started in different vehicles having identical AI modules. This means that the processing parameters converge better when the processing parameters for the central AI module are ascertained. A reliable performance and possibly a faster training process of the central AI module are possible as a result.

In one further specific embodiment of the present method, the server receives adapted internal processing parameters from further vehicles having AI modules, and the present method includes the additional step of selecting at least one of the further vehicles. Only the adapted internal processing parameters of the at least one selected vehicle are used for training the central AI module.

This specific embodiment of the present invention offers the advantage that certain vehicles are taken into account and additional vehicles are not during the training of the central AI module. Using an intelligent preselection, the learning process is therefore able to be accelerated and the final result/the performance of the central AI module, is able to be optimized. The selection may be carried out as a function of a number of already executed learning steps of the additional AI modules, for example. In addition, it is also possible to consider convergence criteria for the selection.

For example, the changes in the processing parameters may be evaluated based on the last learning steps. If the changes are too great, then this seems to indicate a processing chain of the AI module that does sufficiently converge quite yet. If such processing parameters are not meant to be used for training the AI module, then the corresponding vehicles or their adapted processing parameters are able to be ascertained in such a manner and thus not be taken into account. Depending on the specific development of the present method, it is also possible to use processing parameters that were adapted on the basis of only one or very few learning step(s).

In one further specific embodiment of the present method, the method includes the additional step of transmitting the central AI module to at least one vehicle.

This specific embodiment of the present invention offers the advantage that because of the transmission of the central AI module, the vehicles have at their disposal an AI module that has the same processing parameters. Based on this AI module, additional learning processes are able to be carried out in the vehicles. Since all vehicles have the same intermediate status, this increases the probability of a convergence of the central processing parameters.

In one further specific embodiment of the present method, the central AI module transmitted to the vehicle is used for operating the vehicle, so that the present method includes the additional step of a highly or fully automated operation of the vehicle with the aid of the transmitted central AI module.

This specific embodiment of the present invention offers the advantage that all vehicles profit from the training of the central AI module and that an optimized AI module is available for controlling the vehicle. This increases the safety of vehicle passengers and of living creatures located in the environment of the vehicle. The infrastructure and also additional road users are protected in addition.

In one further specific embodiment of the present method, environment data acquired with the aid of an environment sensor system of the first and/or the second vehicle are buffer-stored in the first and/or the second vehicle, and the first and/or the second AI module is/are trained based on the buffer-stored environment data. In particular, the data are buffer-stored for more than 10 seconds, and furthermore in particular for more than 10 minutes, and in particular for more than 24 hours.

This specific embodiment of the present invention offers the advantage that the learning steps need not be carried out in real time in the individual AI modules located in the vehicles but may instead be carried out at any time. Depending on the required processing power and the energy necessary for this calculation or for carrying out a learning step, the calculation may be carried out only during a standstill and/or a battery-charging operation of the corresponding vehicle, for example. If an AI module is trained during a driving operation, then 10 s or 10 min of buffer-storage time may be sufficient. Considerably longer buffer-storage times of more than 24 hours may be required if the AI module is trained only during a charging operation.

Because of the few learning steps of the first and/or the second AI modules, they are not used for a vehicle control in the standard case, for reasons of safety. The AI modules are preferably used as intermediate AI modules whose learning results are primarily used for training the central AI module. In the process, weights adapted in the individual learning steps are transmitted to the central server or to a Cloud.

The present invention also provides a method for training a central artificial intelligence module, an AI module, situated on a server and used for the highly automated or fully automated operation of a vehicle, which method is able to be carried out only on a server. The present method includes the following steps:

Receiving values of first adapted internal processing parameters of a first AI module from a first vehicle and/or a first HIL simulation, whereby input signals entered into the first AI module are translated into output signals based on the first internal processing parameters, and whereby at least one learning step, during which the first internal processing parameters were adapted, was already performed by the first AI module, and the adaptation of the first internal processing parameters has been carried out based on environment data acquired with the aid of an environment sensor system installed in the first vehicle or based on recorded environment data of a vehicle;

Receiving values of second adapted internal processing parameters of a second AI module from a second vehicle and/or a second HIL simulation, whereby input signals entered into the second AI module are translated into output signals based on the second internal processing parameters, and whereby at least one learning step, during which the second internal processing parameters were adapted, was already performed by the second AI module, and the adaptation of the second internal processing parameters has been carried out based on environment data acquired with the aid of an environment sensor system installed in the second vehicle or based on recorded environment data of a vehicle;

Training the central AI module based on the received adapted first and second internal processing parameters.

In addition, a central AI module for the highly or fully automated operation of a vehicle is claimed, the central AI module being developed to translate input signals into output signals, and the translation is carried out based on internal processing parameters. In this instance, the AI module was trained according to one of the methods for training an AI module that forms the basis of the present application.

Moreover, a control system for a highly or fully automated vehicle is provided in accordance with the present invention, which includes the central AI module as described herein.

This specific embodiment of the present invention offers the advantage that it provides an intelligent control system for a vehicle, which allows for a safe operation of the vehicle.

In addition, a computer program is provided in accordance with the present invention, which includes parameters for an AI module which, when loaded into an AI module, upgrade the AI module to a central AI module according to the present application.

BRIEF DESCRIPTION OF THE DRAWINGS

FIG. 1 shows a schematic flow diagram.

FIG. 2 shows a further schematic flow diagram.

DETAILED DESCRIPTION OF EXAMPLE EMBODIMENTS

In one exemplary embodiment, a central AI module is situated on a Cloud computer, which includes a communications module for the exchange of data with vehicles. The central AI module has the task of converting input signals into output signals based on internal processing parameters. In particular, this AI module is meant to allow for a vehicle control on the basis of the incoming environment data. In this instance, the AI module is developed as a neural network, which has a plurality of hidden layers, and the transmission of information between neurons situated in the layers is defined via weights. These weights are variable and responsible to a significant extent for generating the output signals. In this exemplary embodiment, no input data are used for training the central AI module but processing parameters, in particular weights, of further AI modules, the further AI modules being located in vehicles. In this exemplary embodiment, the additional AI modules are situated in multiple passenger cars of the same design, which particularly acquire the identical environment data with the aid of identical environment sensors and in which identical actuators are controlled.

The method carried out for training the central AI module is schematically represented in FIG. 1 and begins in step 101.

In step 102, a learning step is carried out for training a first AI module, which is situated in a first vehicle and designed to translate input signals into output signals on the basis of internal processing parameters, using input signals and an implemented reinforcement learning method. The input signals are environment data, which are recorded with the aid of an environment sensor system installed in the first vehicle. For this purpose, the vehicle has a plurality of cameras, a 360° lidar sensor, radar, GNSS and ultrasonic sensors. Based on the input signals, first internal processing parameters of the first AI module, especially weights between artificial neurons, are adapted in the learning step.

In step 103, a learning step is also carried out in a second vehicle, whose configuration is the same as that of the first vehicle and which has a second AI module. In the learning step, second internal processing parameters of the second AI module are adapted based on input signals.

In step 104, the adapted first processing parameters are transmitted from the first vehicle to the central AI module. The first vehicle is equipped with a communications unit for this purpose, by which the processing parameters are transmitted via radio.

In step 105, the adapted second processing parameters are transmitted from the second vehicle to the central AI module. The second vehicle also has a communications unit for this purpose, by which the processing parameters are transmitted via radio.

In step 106, the central AI module is trained based on the transmitted first and second processing parameters. The values of the individual processing parameters of the first and second vehicle are averaged in the process, and the averaged processing parameters obtained in this manner form the central processing parameters.

The present method ends in step 107.

In one further exemplary embodiment, the processing parameters are not only averaged during the training of the central AI module in step 106 but then flow into the training process in a weighted manner. For one, convergence criteria of the individual AI modules are taken into account for this purpose, which indicate the extent to which the weights of the individual AI modules have already converged. The greater this convergence criteria in an individual KI module, that is to say, the better the convergence, the more its weights are weighted during training. In addition, the number of already performed learning steps is considered in the weighting of the processing parameters during the training of the central AI module. Moreover, the frequency of individual performed driving maneuvers and the criticality of these driving maneuvers is also able to be considered in the weighting of the processing parameters.

In one further exemplary embodiment, the central AI module is trained based on individual AI modules which are located both in vehicles and in the HiL.

In one further exemplary embodiment, the processing parameters are transmitted by way of a cable connection when the vehicle is located at a charging station or is separately connected to the Internet by a cable. The learning steps in the vehicles are preferably carried out while the vehicles are standing and connected to a current source. This makes it possible to utilize the full power of the processing units in the vehicle.

In one further exemplary embodiment, the steps 101 through 106 are repeated until the values of the central processing parameters sufficiently converge. In the process, conditions that define a sufficient convergence are first established. In this particular exemplary embodiment, no value of a processing parameter may change by a value >0.2 in a training step of the central AI module, and the processing parameters may only have values between 0 and 1.

In one further exemplary embodiment, the present method has an additional method step 116.

In step 116, the trained central AI module is transmitted to the first and the second vehicle. This transmission takes place so that the processing parameters of the AI modules situated in the vehicles adapt to one another. Better convergence is able to be achieved in this manner.

In one further exemplary embodiment, a transmission of the trained central AI module to further vehicles is carried out in step 116 as well.

In a further step 126, the vehicles to which the central AI module was transmitted are operated in an automated manner based on the central AI module. In this context, the AI module may either assume individual driving tasks or allow for a fully automated control of the vehicle.

In one further exemplary embodiment, training of a plurality of central AI modules, which are located on a Cloud computer (hereinafter referred to as Cloud), takes place for an autonomous vehicle variant with the aid of a distributed system made up of a plurality of vehicles of the same variant, in which AI modules are implemented in each case. The learning process of the central AI modules is subdivided into the steps shown in FIG. 2 and starts with step 201.

In step 202, a teaching step is carried out in a vehicle for a special driving maneuver, which in this instance is a passing maneuver on a superhighway, with the aid of environment data of this vehicle. Training of the AI module situated in the vehicle is carried out in the process.

In step 203, a learning step is carried out in a further vehicle for a special driving maneuver, which is a passing maneuver on a superhighway in this instance, with the aid of environment data of this further vehicle. Training of the AI module situated in the further vehicle is carried out in the process.

In step 204, the results of the learning steps of the driving maneuvers from the two vehicles from steps 202 and 203 are transmitted to the Cloud.

In step 205, a calculation of the special driving maneuver is carried out in a central AI module in the Cloud based on the results of the individual learning steps of the vehicle, by combining the learning results of both vehicles.

In step 206, these learning steps are repeated, and further vehicles learn further special driving maneuvers and the learning results produced in the process are used for training further central AI modules. It is also possible that the same vehicles learn further driving maneuvers.

In a step 207, the individual results of the special driving maneuvers learned in the central AI modules are combined in a central main AI module. This main AI module is composed of the central AI modules and has an additional situation-detection module, which detects current driving situations, identifies driving maneuvers that are required in these driving situations and supplies the corresponding central AI modules with environment data based on this acquisition and identification, and utilizes their output signals for the control of a vehicle.

In step 208, the central main AI module is transmitted to a plurality of vehicles in order to allow for an automated control in these vehicles based on this AI module.

The present method ends in step 209.

In one further exemplary embodiment, in step 202, buffer-storing of the environment data takes place in a vehicle memory of the vehicle, so that the learning step for a driving maneuver is also able to be calculated after the fact or piece by piece in the vehicle. As a result, no calculation of the learning step in real time has to be carried out. This makes it possible to keep the processing power of the vehicle computer relatively low. After a learning step has been performed based on a set of environment data, the environment data of this learning step are deleted from the vehicle memory or are overwritten with environment data for a further learning step. Because of the transmission of the learning results of identical driving maneuvers of different vehicles to the Cloud in step 204, it is ensured that the broadest possible learning results of a driving maneuver are available in the Cloud for calculating the central AI modules. The transmission powers of Car-to-X communications links from the individual vehicles are scarcely stressed since only the calculation results of a learning step are transmitted to the Cloud.

The repetition of steps 202 through 205 for multiple vehicles and driving maneuvers leads to more efficient and faster learning of the central AI modules because as many input data from as many vehicles as desired (learning steps) are able to be accessed in parallel. The computationally intensive training of the central AI modules using a combination of the learning results of individual learning steps efficiently takes place on the Cloud via HPC (high performance computing).

After the central AI module has been transmitted back to the individual vehicles in step 208, it is able to be executed there in order to realize autonomous driving functions in the vehicles.

In one further exemplary embodiment, the learning operation of an AI for an autonomous vehicle variant is carried out with the aid of a HiL system (hardware in the loop). In the process, the learning steps that previously were carried out in the vehicles are carried out in the HiL system. The system accesses environment data of different driving situations recorded by a plurality of vehicles.

In one further exemplary embodiment, the server is located on the HiL system on which individual AI modules are trained in addition. In the process, the central AI module is updated in parallel after each learning step of the individual AI modules, while further learning steps are carried out in parallel on the individual AI modules of the HiL.

What is claimed is:

1. A method for training a central artificial intelligence module ("AI module"), situated on a server, for highly or fully automated operation of a vehicle, comprising:

executing at least one learning step for training a first AI module situated in a first vehicle or a HIL (hardware in the loop) simulation of the first vehicle, based on input signals which are based on environment data acquired by an environment sensor system installed in the first vehicle or being based on recorded environment data of a vehicle, and first internal processing parameters of the first AI module are adapted during the training, on the basis of which input signals entered into the first AI module are translated into output signals;

executing at least one learning step for training a second AI module situated in a second vehicle or a HIL simulation of a second vehicle, based on input signals which are based on environment data acquired by an environment sensor system installed in the second vehicle or being based on recorded environment data of a vehicle, and second internal processing parameters of the second AI module are adapted during the training, based on which input signals entered into the second AI module are translated into output signals;

transmitting the adapted first internal processing parameters to the server;

transmitting the adapted second internal processing parameters to the server; and training the central AI module based on the transmitted adapted first and second internal processing parameters, wherein only the adapted internal processing parameters of the at least one selected vehicle are utilized for training the central AI module by excluding the environment data acquired by the environment sensor system installed in the first vehicle, the environment data acquired by the environment sensor system installed in the second vehicle, and the recorded environment data from being transmitted to the central AI module.

2. The method as recited in claim 1, wherein the central AI module translates input signals into output signals based on adaptable central internal processing parameters, and in the step of training the central AI module, the central internal processing parameters are adapted based on the adapted first and second internal processing parameters, wherein no input signals of the first or second vehicle or the first or second HIL simulation are used for adapting the central internal processing parameters.

3. The method as recited in claim 1, wherein individual driving functions and/or driving maneuvers are learned with the aid of the first and/or second AI module.

4. The method as recited in claim 1, wherein identical internal output processing parameters are selected for the first and the second AI module, the internal output processing parameters corresponding to the internal processing parameters prior to a first learning process of the AI modules, the first and the second internal output processing parameters having identical output values.

5. The method as recited in claim 1, wherein the server receives adapted internal processing parameters from further vehicles having AI modules, and the method includes the additional step of selecting at least one of the further vehicles.

6. The method as recited in claim 1, further comprising: transmitting the central AI module to at least one vehicle.

7. The method as recited in claim 6, further comprising the highly or fully automated operation of the vehicle using the transmitted central AI module.

8. The method as recited in claim 1, wherein environment data acquired with the aid of the environment sensor system of the first and/or the second vehicle are buffer-stored in the first and/or the second vehicle and the first and/or the second AI module is/are trained based on the buffer-stored environment data, the data being buffer-stored for more than ten seconds.

9. The method as recited in claim 8, wherein the data is buffer-stored for more than 10 minutes.

10. The method as recited in claim 9, wherein the data is buffer-stored for more than 24 hours.

11. A method for training a central artificial intelligence module ("AI module") situated on a server, for highly or fully automated operation of a vehicle, comprising:

receiving values of first adapted internal processing parameters of a first AI module from a first vehicle and/or a first HIL simulation, whereby input signals entered into the first AI module are translated into output signals based on the first internal processing parameters, and whereby at least one learning step in which the first internal processing parameters were adapted was already performed by the first AI module, and the adaptation of the first internal processing parameters has been carried out based on environment data acquired with the aid of an environment sensor system installed in the first vehicle or based on recorded environment data of a vehicle;

receiving values of second adapted internal processing parameters of a second AI module from a second vehicle and/or a second HIL simulation, whereby input signals entered into the second AI module are translated into output signals based on the second internal processing parameters, and whereby at least one learning step in which the second internal processing parameters were adapted was already performed by the second AI module, and the adaptation of the second internal processing parameters has been carried out based on environment data acquired with the aid of an environment sensor system installed in the second vehicle or based on recorded environment data of a vehicle; and training the central AI module based on the received adapted first and second internal processing parameters, wherein only the adapted internal processing parameters of the at least one selected vehicle are utilized for training the central AI module by excluding the environment data acquired by the environment sensor system installed in the first vehicle, the environment data acquired by the environment sensor system installed in the second vehicle, and the recorded environment data from being transmitted to the central AI module.

12. A central artificial intelligences module ("AI module") for the highly or fully automated operation of a vehicle, the central AI module being configured to translate input signals into output signals, and the translation takes place on the basis of internal processing parameters, wherein the central AI module is trained by:

receiving values of first adapted internal processing parameters of a first AI module from a first vehicle and/or a first HIL simulation, whereby input signals entered into the first AI module are translated into output signals based on the first internal processing parameters, and whereby at least one learning step in which the first internal processing parameters were adapted was already performed by the first AI module, and the adaptation of the first internal processing parameters has been carried out based on environment data acquired with the aid of an environment sensor system installed in the first vehicle or based on recorded environment data of a vehicle;

receiving values of second adapted internal processing parameters of a second AI module from a second vehicle and/or a second HIL simulation, whereby input signals entered into the second AI module are translated into output signals based on the second internal processing parameters, and whereby at least one learning step in which the second internal processing parameters were adapted was already performed by the second AI module, and the adaptation of the second internal processing parameters has been carried out based on environment data acquired with the aid of an environment sensor system installed in the second vehicle or based on recorded environment data of a vehicle; and training the central AI module based on the received adapted first and second internal processing parameters, wherein only the adapted internal processing parameters of the at least one selected vehicle are utilized for training the central AI module by excluding the environment data acquired by the environment sensor system installed in the first vehicle, the environment data acquired by the environment sensor system installed in the second vehicle, and the recorded environment data from being transmitted to the central AI module.

13. A control system for a highly or fully automated vehicle comprising at least one central artificial intelligence module ("AI module") for the highly or fully automated operation of a vehicle, the central AI module being configured to translate input signals into output signals, and the translation takes place on the basis of internal processing parameters, wherein the central AI module is trained by:

receiving values of first adapted internal processing parameters of a first AI module from a first vehicle and/or a first HIL simulation, whereby input signals entered into the first AI module are translated into output signals based on the first internal processing parameters, and whereby at least one learning step in which the first internal processing parameters were adapted was already performed by the first AI module, and the adaptation of the first internal processing parameters has been carried out based on environment data acquired with the aid of an environment sensor system installed in the first vehicle or based on recorded environment data of a vehicle;

receiving values of second adapted internal processing parameters of a second AI module from a second vehicle and/or a second HIL simulation, whereby input signals entered into the second AI module are translated into output signals based on the second internal processing parameters, and whereby at least one learning step in which the second internal processing parameters were adapted was already performed by the second AI module, and the adaptation of the second internal processing parameters has been carried out based on environment data acquired with the aid of an environment sensor system installed in the second vehicle or based on recorded environment data of a vehicle; and training the central AI module based on the received adapted first and second internal processing parameters, wherein only the adapted internal processing parameters of the at least one selected vehicle are utilized for training the central AI module by excluding the environment data acquired by the environment sensor system installed in the first vehicle, the environment data acquired by the environment sensor system installed in the second vehicle, and the recorded environment data from being transmitted to the central AI module.

14. A non-transitory computer-readable storage medium on which is stored a computer program, including parameters for an artificial intelligence module ("AI module") which, when loaded into an AI module, upgrade the AI module to a central AI module, the central AI module being for the highly or fully automated operation of a vehicle, the central AI module being configured to translate input signals into output signals, and the translation takes place on the basis of internal processing parameters, wherein the central AI module is trained by:

receiving values of first adapted internal processing parameters of a first AI module from a first vehicle and/or a first HIL simulation, whereby input signals entered into the first AI module are translated into output signals based on the first internal processing parameters, and whereby at least one learning step in which the first internal processing parameters were adapted was already performed by the first AI module, and the adaptation of the first internal processing parameters has been carried out based on environment data acquired with the aid of an environment sensor system installed in the first vehicle or based on recorded environment data of a vehicle;

receiving values of second adapted internal processing parameters of a second AI module from a second vehicle and/or a second HIL simulation, whereby input signals entered into the second AI module are translated into output signals based on the second internal processing parameters, and whereby at least one learning step in which the second internal processing parameters were adapted was already performed by the second AI module, and the adaptation of the second internal processing parameters has been carried out based on environment data acquired with the aid of an environment sensor system installed in the second vehicle or based on recorded environment data of a vehicle; and training the central AI module based on the received adapted first and second internal processing parameters, wherein only the adapted internal processing parameters of the at least one selected vehicle are utilized for training the central AI module by excluding the environment data acquired by the environment sensor system installed in the first vehicle, the environment data acquired by the environment sensor system installed in the second vehicle, and the recorded environment data from being transmitted to the central AI module.

* * * * *